US006665919B1

(12) United States Patent
Kurtz et al.

(10) Patent No.: US 6,665,919 B1
(45) Date of Patent: Dec. 23, 2003

(54) WINDSHIELD WIPER ARM PULLER

(75) Inventors: Scotty R. Kurtz, Clarinda, IA (US); Marvin C. Negley, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 09/935,268

(22) Filed: Aug. 22, 2001

(51) Int. Cl.[7] .................................................. B23P 19/04

(52) U.S. Cl. ................................ 29/262; 29/255; 269/3; 269/6

(58) Field of Search .......................... 29/262, 261, 257, 29/255, 258; 269/3, 6

(56) References Cited

U.S. PATENT DOCUMENTS

| | | | | | |
|---|---|---|---|---|---|
| 2,503,426 | A | * | 4/1950 | Tower | 29/262 |
| 3,862,483 | A | * | 1/1975 | Kloster | 29/258 |
| 5,557,833 | A | * | 9/1996 | Pool | 29/261 |
| 5,586,378 | A | * | 12/1996 | Smith | 29/257 |
| 5,819,386 | A | * | 10/1998 | Koppe | 29/261 |

* cited by examiner

*Primary Examiner*—Lee D. Wilson
(74) *Attorney, Agent, or Firm*—Banner & Witcoff, Ltd.

(57) ABSTRACT

An apparatus for removal of a windshield wiper arm or bracket and blade assembly from a threaded stud or shaft includes gripping jaws which are held in position by a cam that engages and pivots the arms into a desired gripping position. The apparatus further includes a central or axial shaft which may be rotated to drive a specially formed cup against the exposed wiper blade mounting shaft to thereby cause the jaws to move in a manner which will effect axial movement of the jaws and pulling of the wiper arm assembly from the mounting shaft or stud.

1 Claim, 3 Drawing Sheets

WINDSHIELD WIPER ARM PULLER

BACKGROUND OF THE INVENTION

In a principal aspect the present invention relates to a tool that is used to pull or remove windshield wiper arms from the driving shaft or stud of a wiper blade assembly.

Windshield wiper blades are typically mounted on a bracket which is attached to a reversibly rotating drive shaft or stud which reciprocates the bracket and attached blades back and forth over the windshield of a vehicle. The shaft or stud which drives the bracket and blade assembly typically projects outwardly from a vehicle body and comprises a tapered shaft with splines that fit into the bracket and blade assembly. The bracket and blade assembly is typically retained on the tapered spline and spline shaft by a bolt which attaches and mates with the threads on the end of the stud or shaft.

When repairing a vehicle, it is often necessary to remove the entire bracket and blade assembly from the drive shaft or stud. Removal of the bracket and blade assembly from the stud or shaft is often a difficult process because the bracket is wedged on the splined and tapered shaft. Using a lever bar to pry the bracket from the shaft or stud may not be desirable since the lever bar (e.g. Lisle Corporation wiper arm removal tool part 65750) may engage or impact on another part of the vehicle and cause damage. Pulling on the blade assembly is often not effective and is also quite difficult in most circumstances, particularly since the bracket and blade assembly may become corroded and thus fixed on the stud. Consequently, there has developed a need for providing a means to easily and effectively remove a windshield wiper bracket and wiper blade assembly from a stud or drive shaft of a windshield wiper assembly.

SUMMARY OF THE INVENTION

Briefly, the present invention comprises a puller device which includes a center rod or screw that is threadably and telescopically mounted in an outer, concentric screw. A yoke and a cone are mounted on the outer concentric screw. The cone may be translated axially on the outer screw and is shaped to engage pivotal arms mounted on the yoke. The pivotal, yoke arms each include a puller jaw at the extreme end thereof. The jaws are thus positioned on opposite sides of the center rod or screw. The center screw includes a handle which enables rotation of the center screw by grasping and turning the handle. The opposite end of the center screw includes a specially formed windshield wiper assembly stud engagement cup. The stud engagement cup includes a counterbore opening which is partially spherical in shape to avoid damaging the threads of a windshield wiper stud while simultaneously maintaining the cup centered on the stud so that as the center screw is turned, it will effectively elevate the gripping arms thereby withdrawing the bracket and blade assembly from the mounting stud or shaft.

Thus, it is an object of the invention to provide an improved puller apparatus for removal of a windshield wiper arm from a mounting shaft or stud.

It is a further object of the invention to provide a puller which may be utilized for windshield wiper arms and may also be utilized in other environments, for example, as a battery terminal cable puller.

Another object of the invention is to provide a puller device which provides a mechanical advantage that enables ease of operation, which is economical and which is rugged and sturdy.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
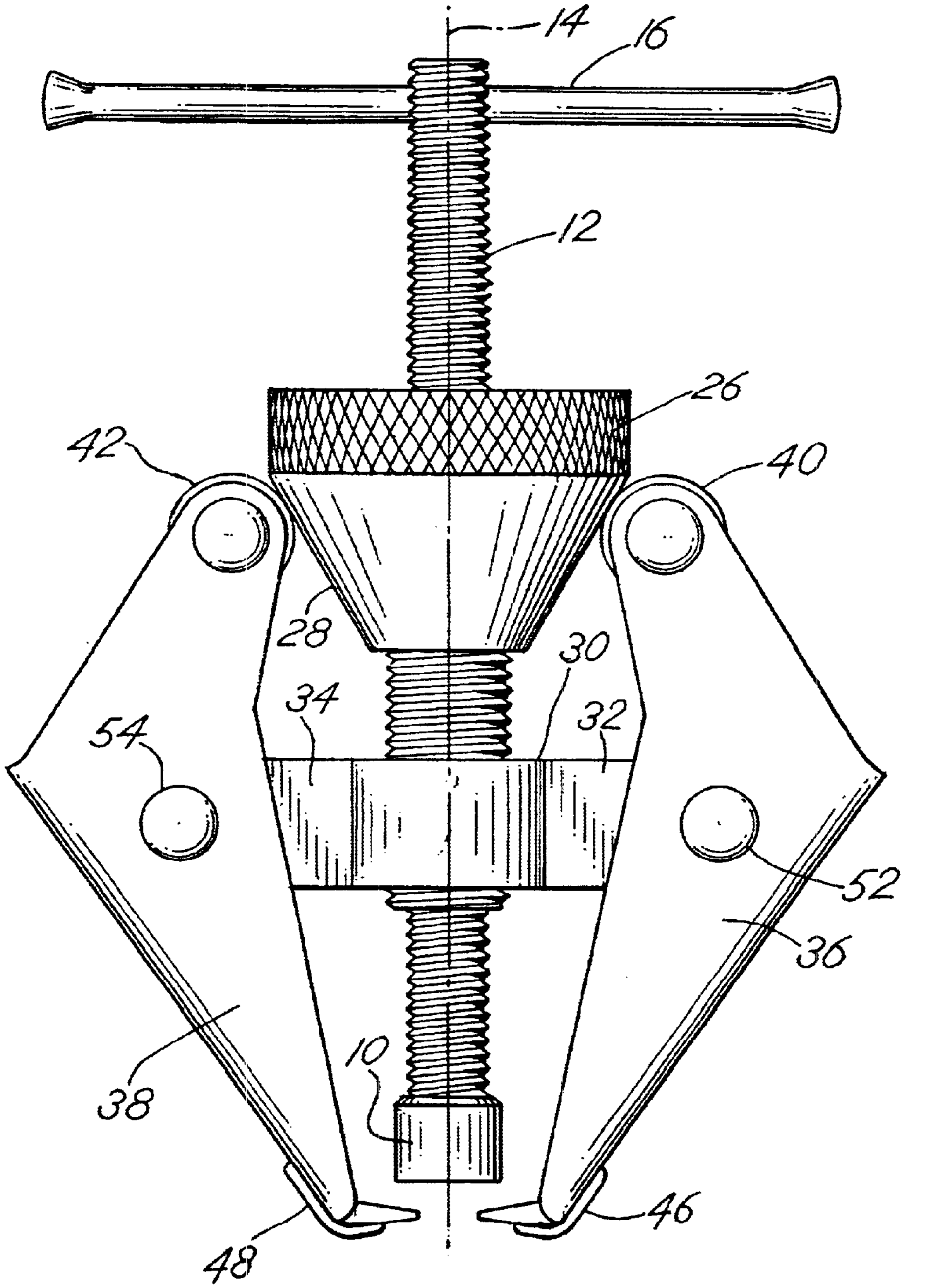
FIG. 1 is a plan view of the windshield wiper arm puller illustrating its component parts including the stud engagement cup at the end of a threaded center shaft, rod or screw.
Figure 2:
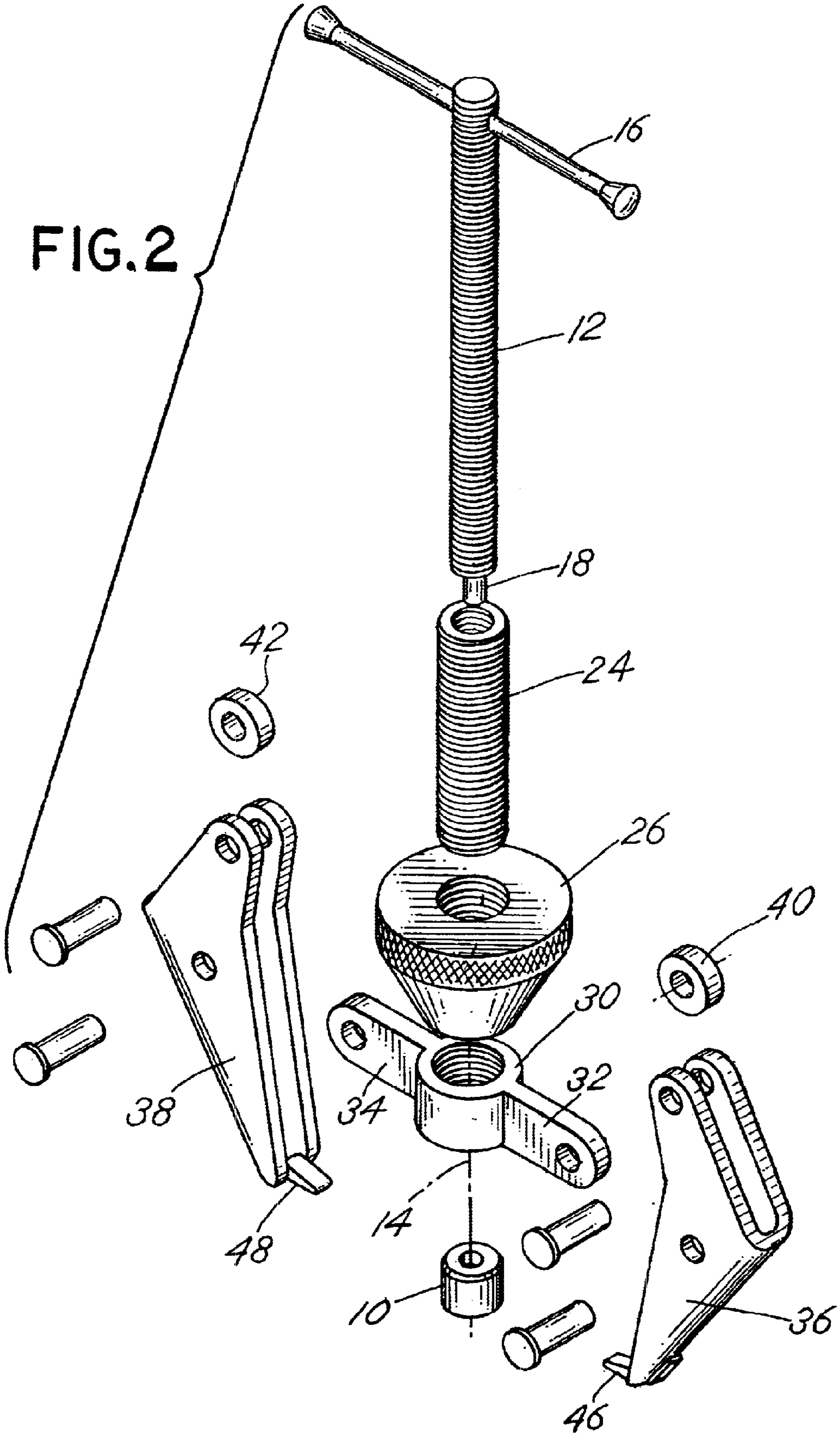
FIG. 2 is an exploded isometric view of the puller of FIG. 1.

Referring to the figures, it is noted that the construction of the puller apparatus of the invention comprises a modification of a prior art puller apparatus (Lisle Corporation battery terminal puller tool no. 54000) designed especially for removal of battery cables from battery terminals. With the present invention, the prior art construction has been utilized for a purpose distinct from that for which it was designed; namely, for removal of windshield wiper bracket and blade assemblies from their mounting stud or shaft. The prior art tool has also been modified to include a wiper blade assembly stud engagement cup 10 in FIG. 1 especially designed for use in combination with a puller mechanism so as to enable the use thereof efficiently with respect to windshield wiper arms or brackets in a manner which will avoid injury and which will significantly improve the effective use of the puller apparatus.

Figure 5:
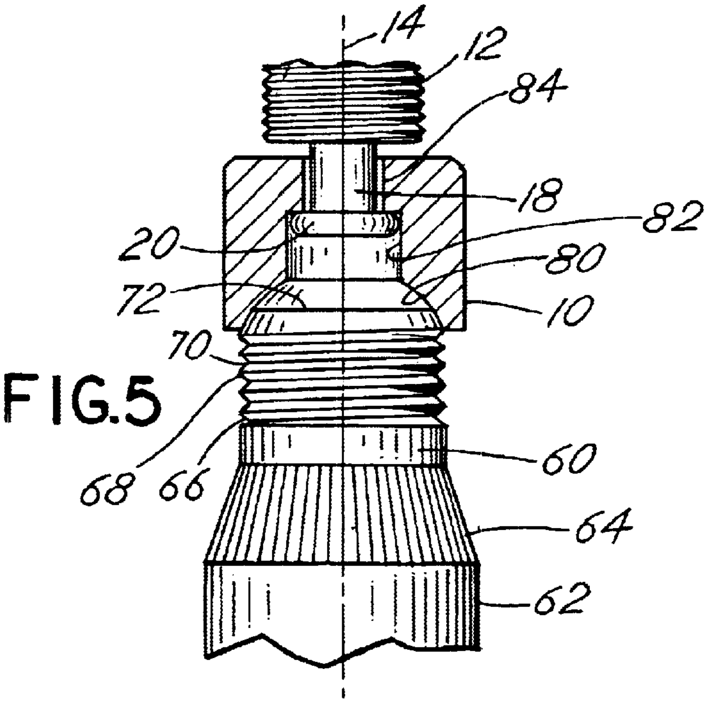
FIG. 5 is an enlarged cross sectional view of the stud engagement cup which is incorporated in the puller apparatus of the invention.

The apparatus, therefore, includes a center screw, rod or shaft 12 which is threaded substantially along its entire length and defines a center line axis 14. A handle 16 is fitted through one end of the screw or shaft 12. The puller further includes the stud engagement cup 10 attached to the opposite end of the shaft or screw 12. As shown in FIG. 5, the shaft 12 includes a coaxial, reduced diameter, short rod section 18 which is peened to form a flange 20 to engage and retain the cup 10 as further described below.

Threadably mounted on the center screw or shaft 12 is an outer screw 24 which includes both inside and outside threads. A cone 26 with a conical surface 28 is threadably mounted on the outer screw 24. A yoke 30 is likewise mounted on the outer screw 24. The yoke 30 includes oppositely extending arms 32 and 34 with pivotally attached jaws 36 and 38 mounted thereon. The jaw 36 includes a follower 40 which engages surface 28. The jaw 38 includes a follower 42 to also engage the conical surface 28. Followers 40, 42 effect pivoting of the jaws 36 and 38 in response to engagement by surface 28.

Jaw 36 further includes a gripping jaw tooth or member 46. Similarly, the jaw or arm 38 includes a gripping jaw tooth or member 48. As the jaws or arms 36 and 38 pivot about respective pivot axis 52 and 54, which attach them to the yoke 30, the jaws 46 and 48 may be driven inwardly toward one another as the conical surface 28 is threaded onto the outer screw 24 so as to approach the yoke 30.

The stud engagement cup 10 is depicted in greater detail in FIG. 5. It is depicted in cross sectional view in association with a typical windshield wiper drive shaft or stud 60. The drive shaft or stud 60 includes the washer arm section 62, a tapered spline 64 and a threaded section 66 designed to receive a nut (not shown) to hold a wiper bracket and blade assembly thereon. The threaded section 66 includes threads having a crest 68 and a valley 70. The threaded section 66 terminates with a generally flat top face 72.

The stud engagement cup 10 includes a spherical counterbore 80 which has a maximum diameter at the open end of the cup 10. The spherical counterbore 80 is concentrically aligned and axially aligned on the center line axis 14. Counterbore 80 then connects into a cylindrical counterbore 82 into which the flange 20 fits to retain the rod or screw 12. Counterbore 82 connects with a lesser diameter counterbore 84 receiving rod section 18 to facilitate the retention of the center screw 12 as previously described.

In operation, the cup 10 is formed to prevent destruction or damage to the threads on the end of the threaded stud 68. Because of the spherical or arcuate shape of the counterbore 80, the threads are not damaged by engagement thereby and the shape of the counterbore effectively precludes deformation of the outer end of the stud 60. Further, the shape of the cup 10, and more particularly, the counterbore 80, maintains the cup 10 centrally located on the stud 60 thereby enhancing the effectiveness and uniform pulling by the puller when attempting to remove a windshield wiper bracket and blade assembly from the shaft 60.

Figure 3:
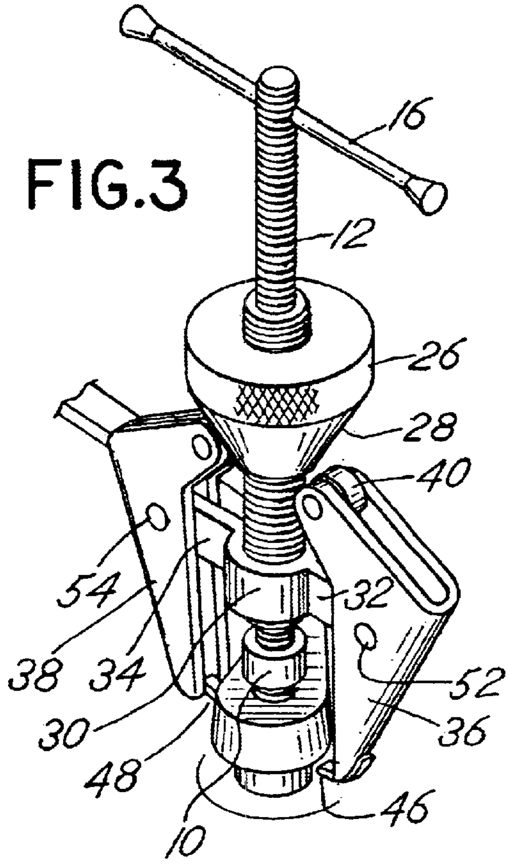
FIG. 3 is an isometric view of the manner of operation of the puller to initially engage with a windshield wiper bracket.
Figure 4:
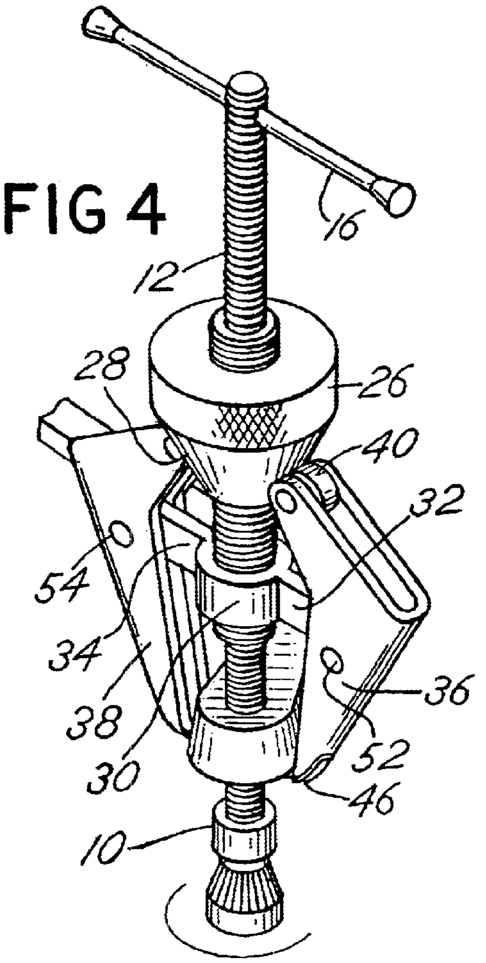
FIG. 4 is an isometric view illustrating the operation of the puller device to remove the windshield wiper bracket from the stud or shaft on which it is mounted.

FIGS. 3 and 4 illustrate in greater detail the mode of operation of the puller. As depicted, the cup 10 is aligned over the top of the shaft or stud 60. The jaws 46 and 48 are fitted under the wiper blade assembly and cause it to move toward the center line axis 14 by screwing the cone 26 in a manner which drives the arms 36 and 38. Thereafter, the handle 16 is turned to effect turning of the center screw or rod 12 causing it to engage tightly against stud or shaft 60 and transporting the arms 36 and 38 and the wiper blade assembly upwardly axially from the shaft 60.

The cup 10, and more particularly, the configuration of the cup 10 insures that the wiper blade arm assembly can be easily removed without damaging the threads on the shaft 60 so that the wiper arm assembly may be replaced as necessary. Additionally, because of the configuration of the cup 10, and more particularly the generally spherical or arcuate counterbore 80, the assembly remains properly centered over the end of variously sized studs so that the pulling force on the wiper blade arms 36, 38 is uniform thereby avoiding damage to that wiper arm assembly and the stud threads and thereby preventing slippage of the puller from the assembly.

Among the more important features of the invention is the configuration shape and construction of the cup 10 for the function of and structural reasons described. It is possible, however, to vary the construction somewhat. For example, a spherical shape is depicted in the drawings as defining the counterbore 80. Other arcuate shapes may be utilized including a frustoconical type counterbore configuration. The preferred configuration is an arcuate or a spherical type configuration in cross section. Thus, while there has been set forth a preferred embodiment of the invention, it is to be understood that their invention is to be limited only by the following claims and equivalents thereof.

What is claimed is:

1. Apparatus for removal of a windshield wiper arm assembly from a stud, said stud including a shaft with an outer end, a tapered spline on the shaft, and a threaded post extending from the shaft at the outer end of the stud, said apparatus comprising, in combination:

a center screw having a longitudinal axis and a stud engaging end;

an outer screw threadably, coaxially mounted on the center screw;

a cone member threadably and coaxially mounted on the outer screw and including a cone surface;

a yoke threaded on the outer screw;

first and second jaw arms, each jaw arm having a pivot point and being pivotally mounted on the yoke, said jaw arms mounted on opposite sides of the axis, each jaw arm including a reaction arm extending in a first direction from the pivot point engageable by the cone surface and also including a gripping jaw extending in a second, opposite direction from the pivot point, said jaws movable toward and away from one another in response to the movement of the cone member against the arms to effect pivoting action of the arms;

a handle connected to the center screw at one end for turning the center screw to thereby move the center screw axially; and a stud engagement cup at the opposite end of the center screw opposite the one end for axially engaging the outer end of a stud, said cup having an axial bore with a first diameter section, a second diameter section, and a center line axis coaxial with the center screw axis and further including a counterbore for engagement with the outer end of a stud, said counterbore formed in a partial spherical shape coaxial with the cup center line axis and with a major dimension at the opening of the counterbore sized to exceed the diameter of the outer end of a stud thereby comprising means to fit over a range of stud diameters without deforming the outer end of the stud and threaded post of the stud and without slipping from the outer end of the stud when engaged by the cup; and an axial rod section at the stud engaging end of said center screw, said axial rod section having a diameter less than the diameter of the center screw and projecting through said axial bore first diameter section in the cup, said axial bore first diameter section having a diameter less than the diameter of the center screw, said axial rod section further including an end flange within the second diameter section of the cup for retaining the cup attached to the axial rod section and oriented coaxially with the center screw.

* * * * *